United States Patent

Santeford, Jr. et al.

[15] 3,690,169

[45] Sept. 12, 1972

[54] SNOW MOISTURE INTEGRATOR

[72] Inventors: Henry S. Santeford, Jr., Fort Collins, Colo.; John G. Meier, Negaunee; George R. Alger, Dollar Bay, both of Mich.

[73] Assignee: Board of Control of Michigan Technological University, Houghton, Mich.

[22] Filed: April 16, 1971

[21] Appl. No.: 134,617

[52] U.S. Cl. ................................................73/171
[51] Int. Cl. ..............................................G01w 1/14
[58] Field of Search..............73/170 R, 171; 177/207

[56] References Cited

UNITED STATES PATENTS 2,497,759   2/1950   Cappleman..................73/171

FOREIGN PATENTS OR APPLICATIONS 69,455   7/1958   France......................177/207
290,097   11/1931   Italy............................177/207

*Primary Examiner*—James J. Gill
*Attorney*—John W. Michael, Gerrit D. Foster, Bayard H. Michael, Paul R. Puerner, Joseph A. Gemignani, Robert E. Clemency, Andrew O. Riteris, Glenn A. Buse and Spencer B. Michael

[57] ABSTRACT

A snow moisture integrator for automatically measuring and recording changes in moisture content related to the surface of a snow pack includes two spaced vertical conduits interconnected by a horizontal conduit. The conduits are positioned in the vicinity of the snow pack and are substantially filled with a non-freezing liquid. A sample holding assembly, including an open top receptacle for holding snow and a float rod connected to the receptacle, floats in the column of liquid in one of the vertical conduits. A float is operatively connected to a continuous stage recorder and floats in the column of liquid in the other vertical conduit. A sample of snow in the receptacle is exposed to the same ambient conditions as the snow pack. As the weight of the snow sample varies, either a loss of weight due to evaporation or a gain of weight due to condensation, the float rod rises or sinks in the liquid in the vertical conduit. The change in amount of liquid thus displaced by the sample holding assembly is reflected in a change in the liquid level in the other vertical conduit. The float responds to the liquid level changes in the conduit and this movement is recorded thereby providing a record of weight changes in the snow sample and, hence, the amount of evaporation and condensation.

12 Claims, 1 Drawing Figure

PATENTED SEP 12 1972
3,690,169
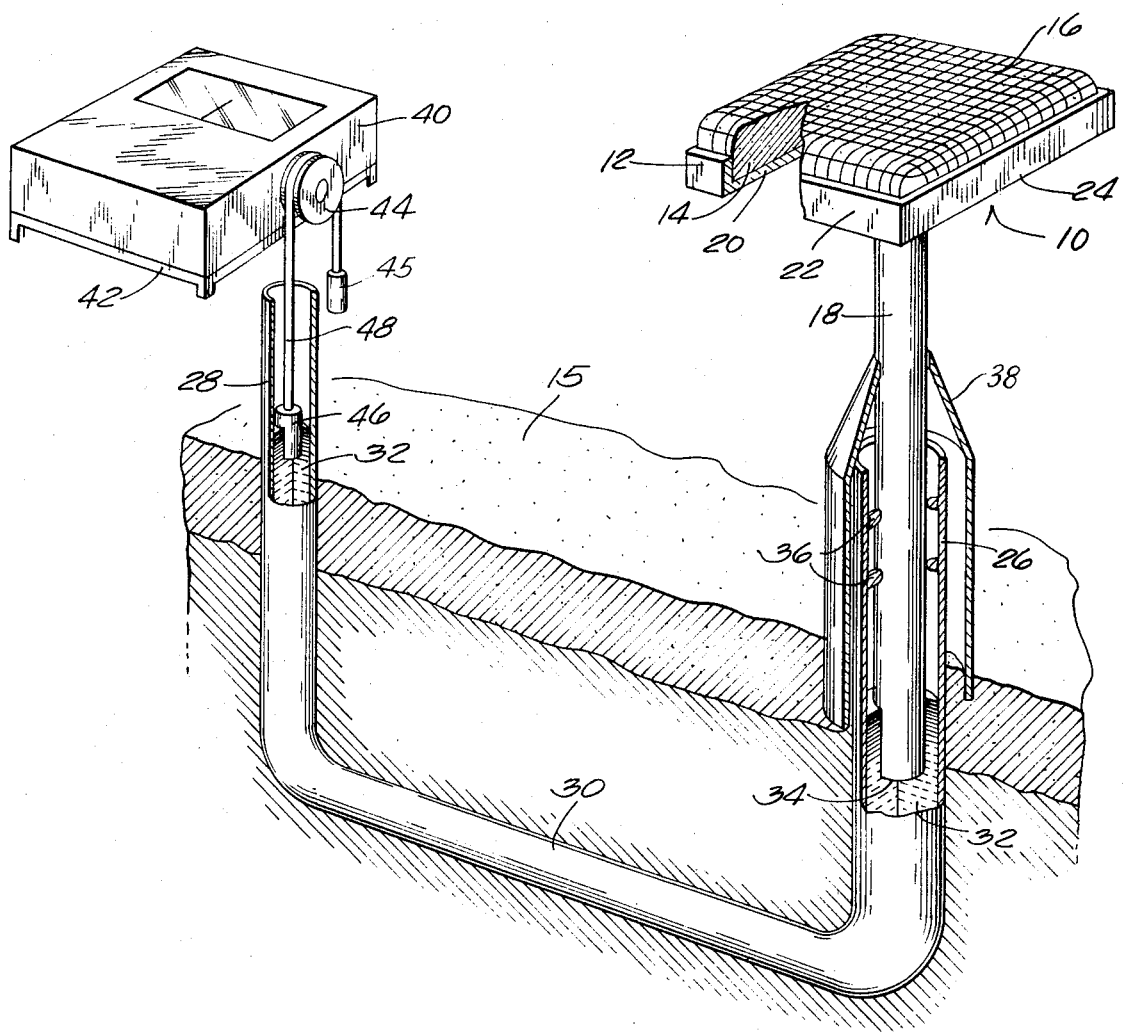
INVENTORS
JOHN G. MEIER
GEORGE R. ALGER
HENRY S. SANTEFORD
By Joseph A. Geniquan
ATTORNEY

SNOW MOISTURE INTEGRATOR

BACKGROUND OF THE INVENTION

This invention relates to measurement of the evaporation and condensation at the surface of a snow pack and, more particularly, to a method and means for continuously and automatically measuring and recording these changes in the moisture content.

In order to evaluate conditions of a snow pack for scientific purposes or as a monitor for potential snow slides, one of the important parameters is the changes in moisture content in the snow pack resulting from evaporation or condensation.

This parameter can be measured by manually taking samples of the snow pack at regular intervals and analytically determining moisture content of the samples by conventional techniques or by other similar manual techniques. However, such a procedure is extremely time consuming and the accuracy of the data obtained thereby is highly dependent upon the particular sampling and/or moisture-determination techniques employed. Also, any changes in the moisture content between the times of sampling are not measured. Continuous measurement and recording is most desirable because it provides a capability of evaluating hour to hour, day to day, and even month to month changes with respect to other existing atmospheric conditions, such as wind velocity, barometric pressure, relative humidity, etc. It is further desirable that the measurements and recording thereof be done automatically to minimize manpower requirements. In order to obtain meaningful data, the measuring means employed should be subjected to the actual environment surrounding the snow pack. Therefore, the measuring means must be capable of operating in adverse weather conditions, and preferably, should be simply constructed in order to minimize initial fabrication and maintenance costs.

SUMMARY OF INVENTION

A primary object of this invention is to provide a simple, inexpensive method and means for continuously and automatically measuring and recording the moisture content, and changes therein, related to the surface of a snow pack.

The snow moisture integrator of this invention includes a recording means and an open receptacle adapted to hold a sample of the snow pack. Separate and spaced vertical conduits and an interconnecting conduit are filled to a predetermined level with a liquid, preferably one having a freezing point substantially below the minimum temperature expected in the vicinity of the snow pack. The conduits are connected so that a displacement of liquid in the first of these vertical conduits produces a corresponding change in the level of the liquid in the second vertical conduit. The sample holding receptacle floats in the column of liquid in the first vertical conduit and a float, operatively connected to the recording means, floats in the column of liquid in the second vertical conduit.

The first vertical conduit and sample-holding receptacle are positioned in the immediate vicinity of the snow pack being evaluated. Preferably, a sample of snow is taken from the surface of the snow pack and placed in the receptacle, and the top surface thereof is exposed to the same ambient conditions as the snow pack. As the weight of the snow sample varies, either a loss of weight due to evaporation or a gain of weight due to condensation, the buoyancy of the sample holding assembly changes, causing a change in the amount of liquid it displaces in the vertical conduit. This change in liquid displacement in the first vertical conduit produces a corresponding change in the liquid level in the second vertical conduit which is measured and recorded by the recording means as the float connected thereto responds to the liquid level changes. Hence, the recording means, which is calibrated to indicate moisture content, continuously measures and records the moisture content, and changes in moisture content, of the sample.

Since the sample is exposed to the same ambient conditions as the snow pack, the measured changes in moisture content are representative of the evaporation and condensation at the surface of the snow pack. The sample holding receptacle is preferably covered with a means which diffuses strong winds to prevent the sample from being blown out of the receptacle, but yet permits free circulation of the ambient air over the surface of the sample.

BRIEF DESCRIPTION OF THE DRAWINGS

The drawing is a side elevational, partially cross-sectional view of a snow moisture integrator embodying this invention.

DESCRIPTION OF THE PREFERRED EMBODIMENT

The snow moisture integrator of this invention is installed in the vicinity of the snow pack for which the moisture content is to be measured. It includes a sample holding assembly 10 comprised of a receptacle 12, constructed from a light weight material and arranged to hold a sample of snow 14 from the snow pack 15, a screen 16, and a float rod 18 attached to the bottom 20 of receptacle 12. Receptacle 12 is open at the top so that the top surface of sample 14 is exposed to the ambient conditions at the snow pack. Screen 16, which is removable fits either inside or over the side walls 22, 24 of receptacle 12 and diffuses strong winds to prevent sample 14 from being blown out of the receptacle, but yet, permits free circulation of the ambient air over the surface of the sample.

Cylindrical, vertical conduits 26, 28 and horizontal conduit 30 interconnecting and establishing liquid communication between the vertical conduits, contain a liquid 32, which is preferably non-freezing, i.e. has a freezing point substantially below the minimum ambient temperature expected in the vicinity of the snow pack. Generally, any low viscosity liquid which will not freeze, or substantially solidify, at this minimum ambient temperature can be used, such as ethylene glycol, mixtures of water and antifreeze additives, motor oils, transmission oils and the like. If desired, the conduits can be provided with heating means and a thermostatic control, in which case liquids having higher freezing points can be used. Although any convenient support means can be used, the bottom portions of vertical conduits 26, 28 and horizontal conduit 30 are preferably buried underground in the vicinity of the snow pack to provide support as shown. If desired, the conduits can be mounted on a mobile support so the device can be easily moved to different locations.

Float rod 18, constructed from a light weight material and preferably tubular with a closed bottom 34, slidably fits inside vertical conduit 26 so that the sample holding assembly 10 is generally free to float in the column of liquid in vertical conduit 26. Float rod 18 is centered within conduit 24 to maintain receptacle 12 in a horizontal position and minimize frictional contact between the inside walls of conduit 24 and the outside surfaces of float rod 18. This can be accomplished by providing conduit 24 with low friction means 36, such as O-rings, which are in slidable engagement with outside surfaces of float rod 18. Shield 38 extending over the upper end of conduit 24, prevents snow from entering the space between conduit 24 and float rod 18.

Continuous stage recorder 40 of conventional design, positioned on platform 42, includes a stylus or pen (not shown) which cooperates with a continuously moving graduated chart (not shown) to make a permanent recording. The stylus or pen is operatively connected to actuator means 44, such as a pulley. Float 46 floating in the column of liquid in vertical conduit 26 is operatively connected to actuator means 44 by cable 48. Cable 48 includes a counter weight 45 so that, when float 46 moves up and down as the liquid level in conduit 26 rises and falls, actuator means 44 is rotated and this in turn actuates the recorder to record the amount of liquid level change.

For operation of the device a sample of snow is placed in receptacle 12 and screen 16 is installed. The sample holding assembly 10 sinks into the column of liquid in conduit 24 displacing an amount of liquid equivalent to the total weight of the sample and sample holding assembly. This is transmitted to conduit 26 through conduit 30 to establish an equilibrium condition. As the weight of sample 14 varies, either a gain of weight due to condensation or a loss of weight due to evaporation, the buoyancy of sample holding assembly 10, and hence the amount of liquid displaced thereby, changes correspondingly. This change in liquid displacement is reflected in a change in the liquid level in conduit 26. Float 46 responds to the liquid level changes in conduit 26 and this change is permanently recorded by the recorder. The recorder can be calibrated so that a predetermined deflection of the stylus or pen resulting from movement of float 46 corresponds to a known amount of change in the moisture content of the sample. Hence, both losses and gains of moisture in the sample are continuously and automatically measured and recorded. Since the sample holding assembly is installed in the vicinity of the snow pack and is open to the atmosphere, the sample is subjected to the same environmental conditions as the snow pack itself. Therefore, the measurements are representative of the actual conditions of the surface of the snow pack and errors introduced by manual sampling analytical techniques are substantially eliminated.

With exception of the recorder, which can be covered with a protective enclosure, all the components of the device are preferably constructed from materials which are capable of extended periods of exposure to the outside conditions without deterioration. As a guide for constructing a snow moisture integrator embodying this invention, receptacle 12 can be two feet square and constructed from a light weight blown plastic material, such as Styrofoam. Float rod 18 can be constructed from an acrylic resin plastic, such as Plexiglas, and has an outside diameter of 6 inches. Conduit 26 can also be constructed by an acrylic resin plastic, such as Plexiglas, and has an inside diameter of 6.5 inches. Conduits 28 and 30 can be constructed from plastic tubing having an inside diameter of one-half inch. Screen 16 is constructed from a light weight, conventional hardware cloth having openings approximately one-half inch square. Liquid 32 is ethylene glycol and conduits 26,28 are positioned approximately 10 feet apart. The size of receptacle 12 and diameters of float rod 18 and conduit 26 can be varied considerably without varying the inside diameter of conduits 28, 30. Of course, larger receptacles will provide better statistical results because of the larger surface area of the sample held thereby; however, the overall construction costs are increased substantially because of the added structural support required and the larger sizes required for conduit 26 and float rod 18.

From the above detailed description, it can be seen that this invention provides an extremely simple, yet highly reliable, method and means for continuously and automatically measuring and recording both the addition and loss of moisture to a representative sample of snow from the snow pack being evaluated. Since liquid displacement is utilized as the technique for determining changes in moisture content, the measurements are unaffected by the physical state of the sample, i.e. the moisture can be in the form of solid snow or liquid.

We claim:

1. A snow moisture integrator comprising, first and second vertical conduits spaced apart and interconnected by a generally horizontal conduit so that said vertical conduits are in liquid communication, said conduits containing a liquid with a column of liquid being defined by each of said vertical conduits;

recording means;

a float operatively connected to said recording means and floating in the column of liquid in said first vertical conduit;

a sample holding assembly adapted to hold a sample of snow from a snow pack for which the moisture content is to be measured and further adapted to float in the column of liquid in said second vertical column so that a change in the buoyancy of said sample holding assembly, corresponding to a change in the weight of said sample, produces a change in the liquid level in said first conduit, said liquid level change in said first vertical conduit being recorded by said recording means as said float responds thereto; and means for locating said second conduit and said sample holding assembly in the vicinity of said snow pack so that the snow held in said sample holding assembly is exposed to the same environment as the surface of said snow pack.

2. The snow moisture integrator according to claim 1 wherein said sample holding assembly includes a generally flat receptacle for holding said sample which is open at the top to expose said sample to the environmental conditions at said snow pack.

3. The snow moisture integrator according to claim 2 wherein said liquid has a freezing point substantially below the minimum ambient temperature expected in the vicinity of said snow pack.

4. The snow moisture integrator according to claim 3 wherein said sample holding assembly includes a vertical float rod connected to the bottom of said receptacle, said float rod being slidably mounted inside said second vertical conduit and partially submerged in the column of liquid therein.

5. The snow moisture integrator according to claim 4 wherein said sample holding assembly includes diffusing means connected to said receptacle and covering said sample, which diffuses winds passing over said sample so as to prevent it from being blown from said receptacle but permits substantially free circulation of the ambient air over the surface of said sample.

6. The snow moisture integrator according to claim 5 including a shield positioned over the upper end of said second conduit to prevent the entry of snow into said second conduit.

7. The snow moisture integrator according to claim 1 wherein the bottom portion of said vertical conduits and said horizontal conduit are mounted underground.

8. The snow moisture integrator according to claim 3 wherein said receptacle is constructed from a light weight, blown plastic material.

9. The snow moisture integrator according to claim 5 wherein said vertical conduits and said float rod are cylindrically shaped and said float rod is tubular with a closed bottom.

10. A method for determining the changes in the moisture content in the surface of the snow pack comprising, arranging conduit means containing a liquid to define first and second vertical liquid columns, said liquid columns being in liquid communication with each other;

providing means for holding a sample of snow from the snow pack, said snow sample being exposed to the environmental conditions at said snow pack;

floating said sample holding means in said first liquid column so that the amount of liquid displaced therein, corresponding to the combined weight of said sample and sample holding means, is reflected by changes in the liquid level of said second liquid column; and measuring said changes in the liquid level of said second liquid column.

11. The method according to claim 10 wherein said measuring and determining is accomplished by a float means floating in said second liquid column operatively connected to a means calibrated to indicate the amount of and changes in moisture in said sample.

12. A method according to claim 11 wherein said calibrated means is a continuous stage recorder.

* * * * *